250/201

United States Patent [19]
Goralnick et al.

[11] Patent Number: 4,467,186
[45] Date of Patent: Aug. 21, 1984

[54] MIRROR ACTUATOR CONTROL SYSTEM

[75] Inventors: Norman S. Goralnick, Lexington; George H. McLellan, Jr., Wilmington, both of Mass.

[73] Assignee: The United States of America as represented by the Secretary of the Air Force, Washington, D.C.

[21] Appl. No.: 343,041

[22] Filed: Jan. 27, 1982

[51] Int. Cl.$^3$ ............... G01J 1/20; G05D 23/275; G05B 21/02
[52] U.S. Cl. ............................... 250/201; 318/632; 318/636
[58] Field of Search ........... 250/201, 204; 455/604, 455/619; 318/632, 636

[56] References Cited
U.S. PATENT DOCUMENTS

| | | | |
|---|---|---|---|
| 3,708,736 | 1/1973 | Hoshina et al. | 318/632 |
| 4,326,800 | 4/1982 | Fitts | 250/201 |
| 4,399,356 | 8/1983 | Feinleib et al. | 250/201 |

Primary Examiner—David C. Nelms
Assistant Examiner—Ernest Austin, II
Attorney, Agent, or Firm—Donald J. Singer; William Stepanishen

[57] ABSTRACT

A mirror actuator control system utilizing a wavefront sensor to determine the resulting angle error signal between the wavefront tilt angle and the mirror tilt angle. The resulting angle error signal is used to drive the actuator unit which controls the mirror tilt angle.

10 Claims, 5 Drawing Figures

4,467,186

MIRROR ACTUATOR CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to servo control systems, and in particular to a mirror actuator control system to control the tilt angle of the mirror.

In general, a servo system by definition is a combination of elements for the control of a source of power in which the output of the system or some function of the output is fed back for comparison with the input and the difference between these quantities is used in controlling the power. With the advent of the laser, servo systems and optics have been combined for various system applications. One of which applications is controlling a laser to scan a target or an area to provide data thereabout. Such systems basically use the laser as an optical device to obtain information or data for various purposes. The servo portion of the system is utilized to maintain the laser on target and to provide optimum illumination of said target.

In servo systems and particularly in position loop servo systems used for positioning a movable member by use of a position feedback signal, there exists the problem of mechanical resonance. Mechanical resonance is oscillation of the movable member of a system at a frequency or frequencies at or near the natural resonant frequency of the system depending on system damping. Such occurs because of the inherent response of a spring/mass system with less than critical damping. Attempts to eliminate or reduce the possibility of such resonance have included the use of filters to attenuate the position error signals at frequencies near the natural resonant frequency of the system. Problems result from the fact that such attenuation is usually accomplished by an electrical filter. However, such filters also usually cause a phase shift of the feedback signal and at times the phase shift of the feedback signal can cause the system to perform worse than it did without the filter even though some attenuation of the feedback signal is achieved.

SUMMARY OF THE INVENTION

The present invention utilizes a mirror actuator control loop to measure and null the error between the mirror angular position and the angle of tilt of light rays reflected from the mirror. The error signal for a given mirror axis which is determined by a wavefront sensor, is amplified and applied to a compensation network. The compensation network which comprises an integrator and double lead network provides a correctioon signal for the mirror actuator mass and flexure natural frequency. The output correction signal of the compensation network is amplified and applied to the mirror actuator to null the error.

It is one object of the present invention, therefore, to provide an improved mirror actuator control system.

It is another object of the invention to provide an improved mirror actuator control system wherein the angle of the tilt error between the mirror and the rays of light that are reflected from the mirror are measured and nulled.

It is another object of the invention to provide an improved mirror actuator control system wherein a compensation network comprising an integrator and a double lead network, compensate for the mirror mass and fixture.

It is yet another object of the invention to provide an improved mirror actuator control system wherein a wavefront sensor determines the angular error in mirror orientation.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
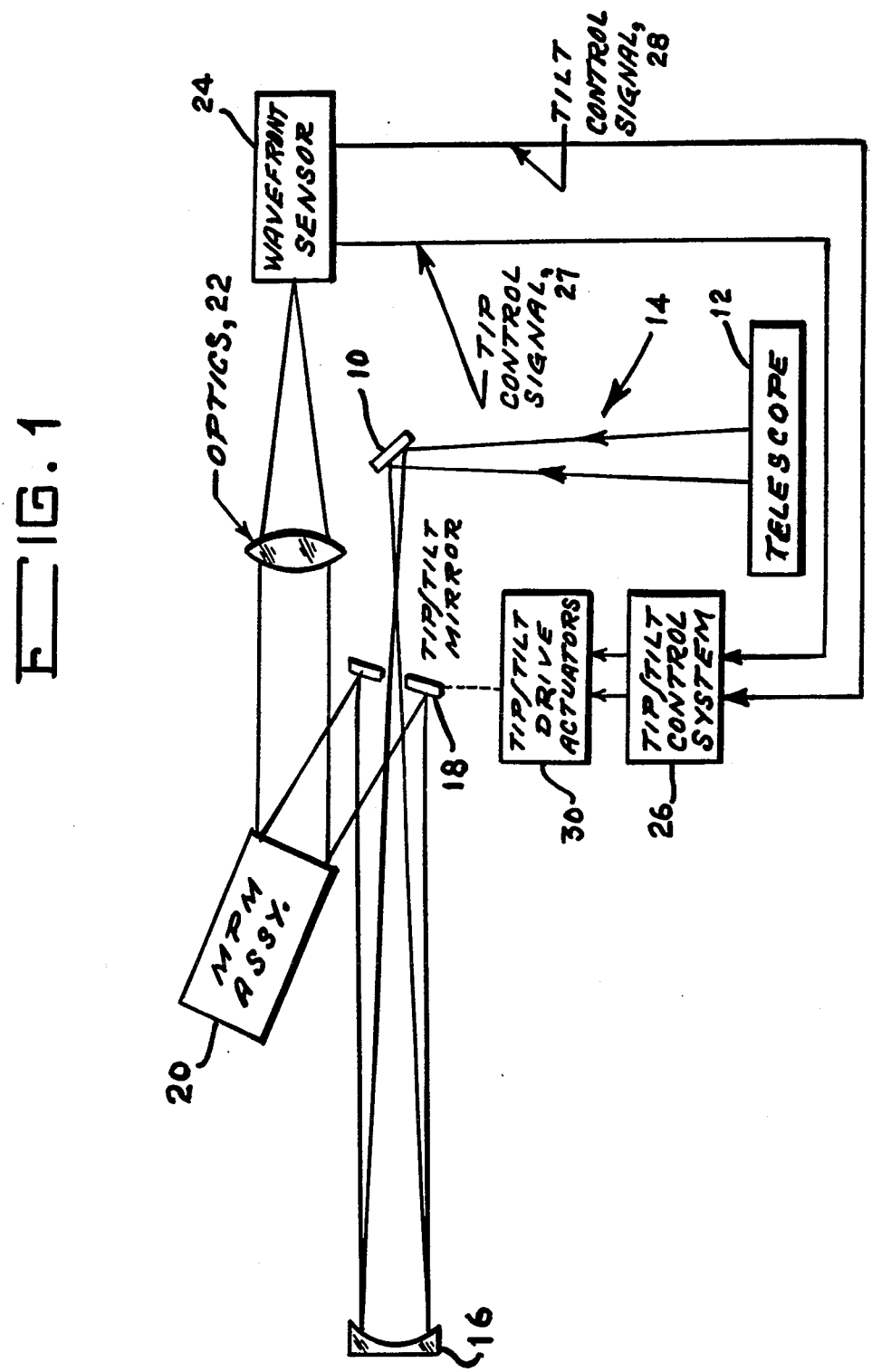
FIG. 1 is a block diagram of the wavefront tilt angle detector which is utilized in the mirror actuator control system.

Referring now to FIG. 1, there is shown a mirror 10 which is positioned at some predetermined angle with respect to the remote telescope unit 12. The light rays 14 from the telescope unit 12 are directed to the fold mirror 10. The fold mirror 10 reflects the light rays 14 through a hole in the tip/tilt mirror unit 18 to a collimator mirror 16. The collimetor mirror 16 provides a reflected collimated beam which is directed to and is reflected from the front surface of the tip/tilt mirror unit 18 to the reflective surface of the monolithic piezoelectric mirror assembly unit 20. The beam from the monolithic piezo-electric mirror assembly unit 20 is then focused by the optics unit 22 onto a photomultiplier tube array which is part of the front end of the wavefront sensor unit 24. The wavefront sensor unit 24 processes the resultant photomultiplier tube electrical signals, (into the appropriate wavefront tip and tilt control signsls, 27, 28. The control signals 27, 28 are applied to tip/tilt control systems 26 which provides the loop compensation and develops the drive signals for the tip/tilt drive actuator unit 30. The actuator unit 30 controls the tip/tilt mirror 18 in a manner to reduce the tip and tilt control signals 27, 28 to zero.

Figure 2:
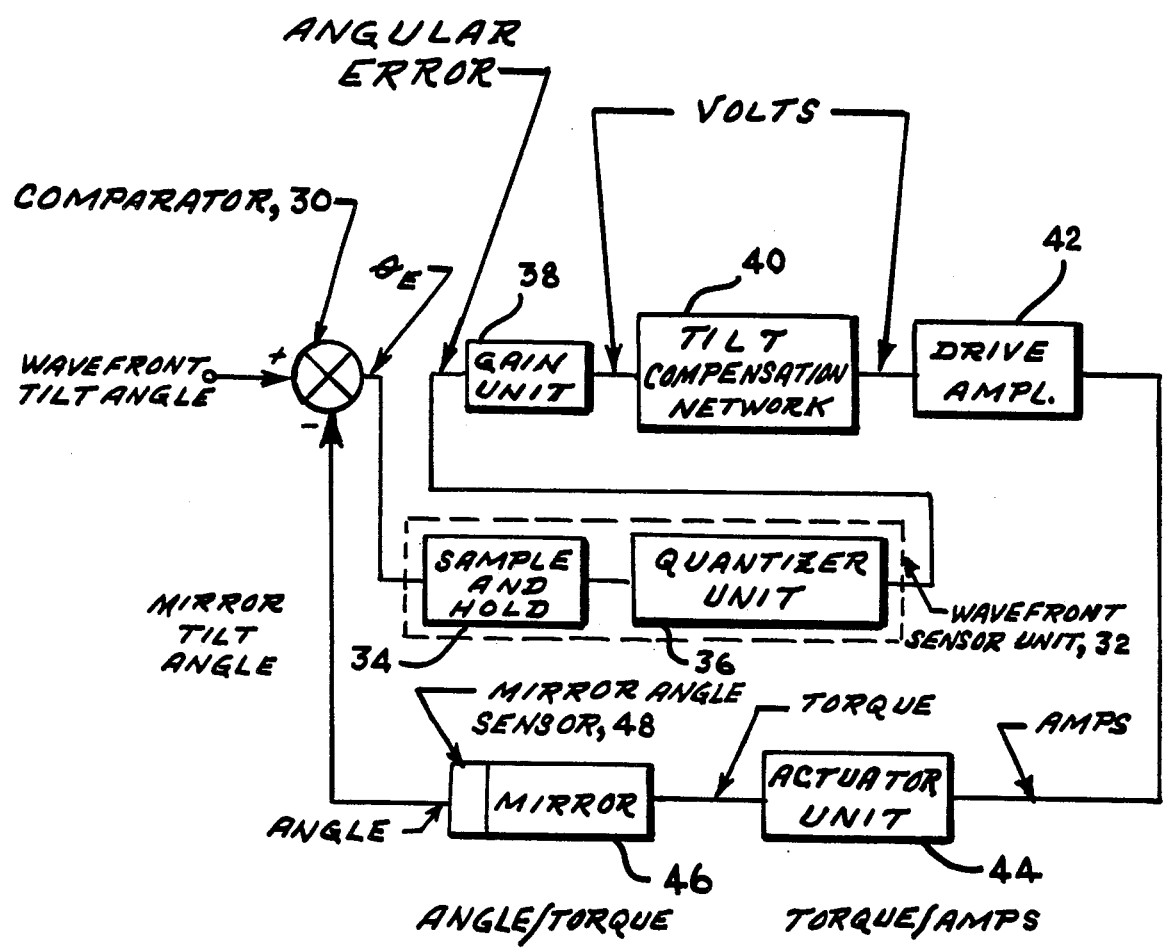
FIG. 2 is a block diagram of the mirror actuator control system according to the present invention.

Turning now to FIG. 2, there is shown a comparator unit 30 receiving the wavefront tilt angle signal, $\theta_{in}$ and the mirror tilt angle signal $\theta_{mir}$. The output signal from the comparator unit 30 is the tilt error signal, $\theta_E$ which is applied to the wavefront sensor unit 32. The wavefront sensor unit 32 comprises a sample and hold circuit 34 and a quantizer unit 36. The tilt error signal $\theta_E$ is sampled for approximately 100 microseconds in the sample and hold unit 34 and the quantizer unit 36 provides an analog error signal which is proportional to the mirror tilt error. A gain unit 38 receives the error signal which is amplified by the gain factor of the gain unit 38. The amplified error signal is applied to the tilt compensation network 40 wherein compensation for the system natural frequency and for noise and other fluctuations is provided. A drive amplifier unit 42 receives the voltage signal from the tilt compensation unit 40 and provides a current signal to drive the actuator unit 44. The mirror 46 is positioned by the actuator unit 44 according to the received current signal. A mirror angle sensor unit 48 is attached to the mirror 46 to provide the mirror tilt angle signal to the comparator unit 30.

The operation of the control system is basically as follows. The wavefront tilt angle, $\theta_{in}$, is compared with the tilt mirror angle, $\theta_{MIR}$, and the resulting error is processed by the wavefront sensor which is represented by a sample and hold unit with a 100 microsecond sample time, and a quantizer unit with a range of 8 bits (38.4$\mu$ radians) and a least significant bit of 0.15$\mu$ radians.

The processed signal along with noise that might be generated, is amplified in the analog computer and drive control system (Gain block) and then applied to the compensation network. The compensation network is comprised of an electronic integrator to ensure that the steady state error is within the least significant bit; a double lead network to compensate for the mirror bezel actuator mass, and flexure natural frequency; and a double lag beyond the loop crossover frequency to reduce high frequency noise.

The output of the compensation network is applied to a current amplifier which is comprised of a power amplifier with current feedback. The gain in the current amplifier is set to ensure that the lag is beyond the loop crossover frequency. The resulting current in the actuator is transformed to a force (BLxi) which is acting at radius R and results in a torque, T. The torque is applied to the mechanical load which consists of the total inertia, J, the flexure spring constant, $K_f$, and the damping, D which is mainly due to the laminated flexure design within the actuator. The actuator unit operates on a curve which may be measured and shown to be S-shaped. However, for the purpose of computer simulation, the square shape is simpler to simulate for computer programming and results in a more accentuated effect.

Figure 3:
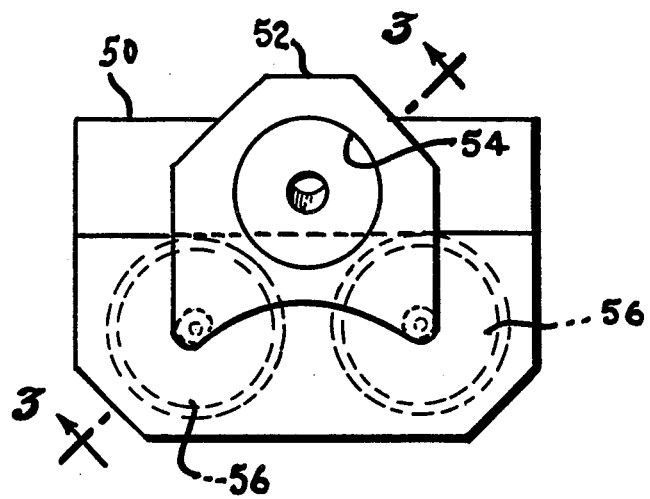
FIG. 3 is a top view of a two axis tip/tilt mirror driver apparatus.
Figure 4:
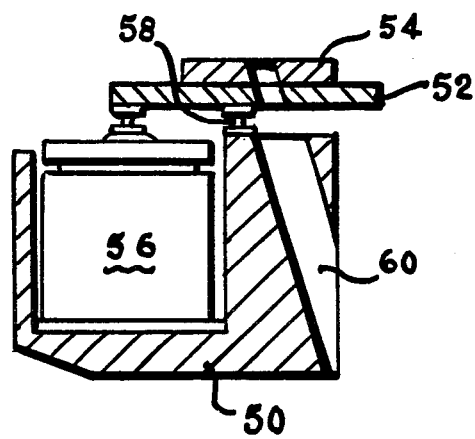
FIG. 4 is a sectional view along line 3—3 of FIG. 3.

In FIG. 3, there is shown a top view of the two axis tip/tilt mirror driver apparatus. The two axis tip/tilt mirror driver apparatus comprises a tip/tilt housing assembly 50, a bezel 52, a mirror 54, and a pair of actuator units 56. Turning to FIG. 4 which is a cross-sectional view along the line 3—3 of FIG. 3, there is shown in greater detail the position of the actuator unit 56 within the tip/tilt housing assembly 50. There is also shown the position of a flex pivot 58 which is located between the bezel 52 and the tip/tilt housing assembly 50. The flex pivot 58 is the point about which the bezel 52 and the mirror 54, which is fastened in any conventional manner thereto, taking into account the requirement for high bandwidth operations, may be moved. A hole 60 is provided through the tip/tilt housing assembly 50, the bezel 52 and the mirror 54 to permit the light which is reflected from the fold mirror to pass through to the collimator mirror.

Figure 5:
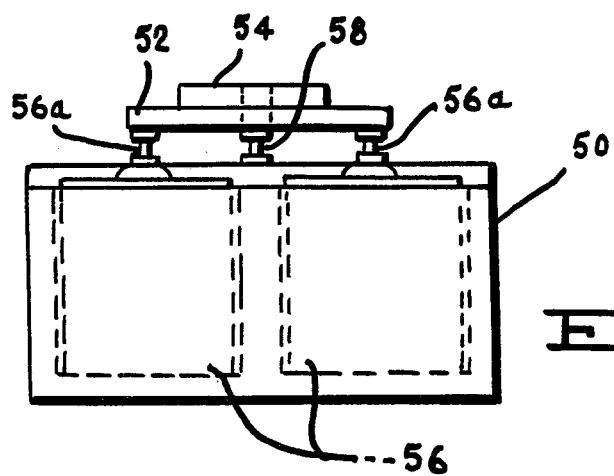
FIG. 5 is a front view of the two axis tip/tilt mirror driver apparatus.

In FIG. 5, there is shown a front view of the two axis tip/tilt mirror driver apparatus wherein it may be seen that a pair of actuator units 56 are mounted in the tip/tilt housing assembly 50. The mirror 50 may be mounted by any suitable conventional means for high bandwidth operation, to the top of the bezel 52. The bezel 52 is mounted by means of the flex pivot 58 to the tip/tilt housing assembly 50. The actuator units 56 include plungers 56a which contact the bezel 52 to tip and or tilt the bezel 52 and thereby the mirror 54. The component units which are used in FIG. 2 have the following typical operating parameters:

the sample and hold 34 has a sampling time of 100 microseconds the quantizer unit 36 has a LSB=0.15$\mu$ radians. with saturation set at 38.4$\mu$ rad (8 bits)

the gain unit has a gain unit of 9070 volts/radian the compensation network has an integration, 1/S and a double lead-lag network given by $$\frac{\left(\frac{S}{\omega_n} + 1\right)^2}{\left(\frac{S}{10\omega_{co}} + 1\right)^2},$$

where the natural frequency of the mechanical system, $\omega n$, is defined as $\omega n/2\pi = 20$ Hz and the overall loop crossover frequency, $\omega co$, is defined as $\omega co/2\pi = 300$ Hz for a linear system with a gain of 9070 Volt/radian the drive amplifier unit 42 is given by $$\frac{10}{\frac{S}{10000} + 1}$$

the actuator unit 44 has a torque sensitivity of 45.8 in-oz/amp, and, the mechanical load is represented by $$\frac{\frac{1}{K_f}}{\left(\frac{J}{K_f}\right) S^2 + \left(\frac{D}{K_f}\right) S + 1},$$

where $K_f=2198$, J$=0.1392$; the damping coefficient, $\zeta$, is in the range of 0.05–0.1, and $D=2\zeta\sqrt{K_f J}$ Thus the parameters which are shown in FIG. 2 result in an overall loop crossover frequency at 300 Hz based on a linear system and reducing the gain will correspondingly reduce the crossover frequency.

Although the invention has been described with reference to a particular embodiment, it will be understood to those skilled in the art that the invention is capable of a variety of alternative embodiments within the spirit and scope of the appended claims.

What is claimed is:

1. A mirror actuator control system comprising in combination:

means for sensing a wavefront tilt angle, said wavefront tilt angle sensing means providing a wavefront tilt angle signal, means for sensing a mirror tilt angle, said mirror tilt angle sensing means providing a mirror tilt angle signal, means for comparing said wavefront tilt angle signal with said mirror tilt angle signal, said comparing means providing a tilt error signal, a wavefront sensor means sampling and quantizing said tilt error signal, said wavefront sensor means providing a tilt correction signal, a gain unit having a predetermined gain factor, said gain unit amplifying said tilt correction signal by said gain factor;

a compensation network receiving said tilt correlator signal, said compensation network maintaining the signal level with a predetermined range, said compensation network compensating for the mechanical system natural frequency, said compensation network reducing the high frequency noise in said tilt correction signal, said compensation network providing an output signal, a drive amplifier receiving the output signal from said compensation network, said drive amplifier having a correct gain to provide a lag beyond the loop crossover frequency, said drive amplifier providing a current signal, and, an actuator means receiving said current signal and providing a torque in response thereto, said torque being applied to a mirror to change its tilt angle.

2. A mirror actuator control system as described in claim 1 wherein said wavefront sensor means comprises a sample and hold means to sample said tilt error signal, and, a quantizer means to process said tilt error signal into one of a finite number of 256 subranges.

3. A mirror actuator control system as described in claim 1 wherein said gain factor is 9070 volts/radian.

4. A mirror actuator control system as described in claim 1 wherein said drive amplifier comprises a current amplifier.

5. A mirror actuator control system as described in claim 1 wherein said compensation means comprises an integrator and a double lead lag network.

6. A mirror actuator control system as described in claim 1 wherein said actuator means comprises in combination:

a pair of drive units to respond to said current signal,
an actuator housing to support said pair of drive units,
a flexible pivot means attached to said actuator housing,
a bezel means supported by said flexible pivot means and said pair of drive units, said bezel means fixedly attached to said flexible pivot means, and,
a mirror attached to said bezel means, said mirror having a hole passing through the center thereof, said hole extending through said bezel and said actuator housing.

7. A mirror actuator control system as described in claim 2 wherein said sampling time is 100 microseconds.

8. A mirror actuator control system as described in claim 2 wherein said finite number of subranges is 8 bits.

9. A mirror actuator control system as described in claim 4 wherein said current amplifier is a power amplifier with current feedback.

10. A mirror actuator control system as described in claim 7 wherein the least significant bit equals 0.15 microradians.

* * * * *